(12) United States Patent
Chae et al.

(10) Patent No.: US 11,948,510 B2
(45) Date of Patent: Apr. 2, 2024

US011948510B2

(54) PIXEL CIRCUIT AND DISPLAY DEVICE HAVING THE SAME

(71) Applicant: SAMSUNG DISPLAY CO., LTD., Yongin-si (KR)

(72) Inventors: Soojung Chae, Seoul (KR); Seokhwan Bang, Yongin-si (KR); Seokje Seong, Seongnam-si (KR); Jinseok Oh, Pyeongtaek-si (KR); Woobin Lee, Hwaseong-si (KR); June Whan Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/064,813

(22) Filed: Dec. 12, 2022

(65) Prior Publication Data

US 2023/0402007 A1 Dec. 14, 2023

(30) Foreign Application Priority Data

Jun. 13, 2022 (KR) ........................ 10-2022-0071251

(51) Int. Cl.
*G09G 3/32* (2016.01)
*G09G 3/3233* (2016.01)

(52) U.S. Cl.
CPC ... *G09G 3/3233* (2013.01); *G09G 2300/0426* (2013.01); *G09G 2300/0809* (2013.01)

(58) Field of Classification Search
CPC ......... G09G 3/3233; G09G 2300/0426; G09G 2300/0809
See application file for complete search history.

(56) References Cited

U.S. PATENT DOCUMENTS

| | | | | |
|---|---|---|---|---|
| 10,468,434 | B2 | 11/2019 | Lee et al. | |
| 2016/0042694 | A1* | 2/2016 | Lim | G09G 3/3233 345/78 |
| 2018/0254008 | A1* | 9/2018 | Toyomura | G09G 3/3233 |
| 2018/0261156 | A1* | 9/2018 | Yamashita | G09G 3/3233 |
| 2020/0075705 | A1* | 3/2020 | Toyomura | G09G 3/20 |
| 2022/0244554 | A1* | 8/2022 | Hamade | G03B 33/08 |

FOREIGN PATENT DOCUMENTS

KR 10-2256831 A 5/2021

* cited by examiner

*Primary Examiner* — Towfiq Elahi
(74) *Attorney, Agent, or Firm* — Lewis Roca Rothgerber Christie LLP

(57) ABSTRACT

A pixel circuit includes a first driving transistor including a gate electrode connected to a first node, a first electrode to receive a first power voltage, and a second electrode connected to a second node, a second driving transistor including a gate electrode and a second electrode connected to the second node, a first electrode to receive the first power voltage, and a back gate electrode connected to the first node, a write transistor including a first electrode to receive a data voltage and a second electrode connected to the first node, an initialization transistor including a gate electrode to receive an initialization gate signal, a first electrode to receive an initialization voltage, and a second electrode connected to the second node, a storage capacitor connected to the first and second nodes, and a light emitting element connected to the second node and configured to receive a second power voltage.

20 Claims, 18 Drawing Sheets

PIXEL CIRCUIT AND DISPLAY DEVICE HAVING THE SAME

CROSS-REFERENCE TO RELATED APPLICATION

This application claims priority to, and the benefit of, Korean Patent Application No. 10-2022-0071251, filed on Jun. 13, 2022, in the Korean Intellectual Property Office KIPO, the contents of which are herein incorporated by reference in their entireties.

BACKGROUND

1. Field

Embodiments of the present disclosure relate to a pixel circuit including a driving transistor and a display device having the pixel circuit.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and to the data lines. The gate driver may provide gate signals to the gate lines. The data driver may provide data voltages to the data lines. The timing controller may control the gate driver and the data driver.

The display device may display an image by applying data voltages to the pixels, and the data voltages applied to the pixels may be applied to a gate electrode of a driving transistor of each of the pixels. In addition, the driving transistor may generate a driving current corresponding to a gate voltage (e.g., a voltage of the gate electrode), and the light emitting element may emit light with a luminance according to the driving current. However, a luminance change may occur according to a deviation of threshold voltages of the driving transistors of the pixels.

SUMMARY

Embodiments of the present disclosure provide a pixel circuit to increase a driving range of a driving transistor.

Embodiments of the present disclosure also provide a display device having the pixel circuit.

According to embodiments of the present disclosure, a pixel circuit may include a first driving transistor including a gate electrode connected to a first node, a first electrode configured to receive a first power voltage, and a second electrode connected to a second node, a second driving transistor including a gate electrode connected to the second node, a first electrode configured to receive the first power voltage, a second electrode connected to the second node, and a back gate electrode connected to the first node, a write transistor including a gate electrode configured to receive a write gate signal, a first electrode configured to receive a data voltage, and a second electrode connected to the first node, an initialization transistor including a gate electrode configured to receive an initialization gate signal, a first electrode configured to receive an initialization voltage, and a second electrode connected to the second node, a storage capacitor including a first electrode connected to the first node, and a second electrode connected to the second node, and a light emitting element including a first electrode connected to the second node, and a second electrode configured to receive a second power voltage.

The first driving transistor may further include a back gate electrode connected to the second node.

The first driving transistor may further include a back gate electrode connected to the first node.

The pixel circuit may further include an emission transistor configured to apply the first power voltage to the first driving transistor and to the second driving transistor in response to an emission signal.

The pixel circuit may further include a reference transistor configured to apply a reference voltage to the first node in response to a reference gate signal.

The pixel circuit may further include a hold capacitor including a first electrode configured to receive the first power voltage and a second electrode connected to the second node.

The write transistor may further include a back gate electrode connected to the gate electrode of the write transistor, wherein the initialization transistor further includes a back gate electrode connected to the gate electrode of the initialization transistor.

According to embodiments of the present disclosure, a pixel circuit may include a first driving transistor including a gate electrode connected to a first node, a first electrode configured to receive a first power voltage, and a second electrode connected to a second node, a second driving transistor including a gate electrode connected to the second node, a first electrode connected to a third node, a second electrode connected to the second node, and a back gate electrode connected to the first node, a write transistor including a gate electrode configured to receive a write gate signal, a first electrode configured to receive a data voltage, and a second electrode connected to the second node, an initialization transistor including a gate electrode configured to receive an initialization gate signal, a first electrode configured to receive an initialization voltage, and a second electrode connected to a fourth node, a storage capacitor including a first electrode connected to the first node, and a second electrode connected to the fourth node, a compensation transistor including a gate electrode configured to receive a compensation gate signal, a first electrode connected to the third node, and a second electrode connected to the first node, a first emission transistor including a gate electrode configured to receive an emission signal, a first electrode configured to receive the first power voltage, and a second electrode connected to the third node, a second emission transistor including a gate electrode configured to receive the emission signal, a first electrode connected to the second node, and a second electrode connected to the fourth node, and a light emitting element including a first electrode connected to the fourth node, and a second electrode configured to receive a second power voltage.

The first driving transistor may further include a back gate electrode connected to the second node.

The pixel circuit may further include a reference transistor configured to apply a reference voltage to the first node in response to a reference gate signal.

The compensation gate signal may be the same as the write gate signal.

The pixel circuit may further include a first bias transistor including a gate electrode configured to receive a bias gate signal, a first electrode configured to receive a bias voltage, and a second electrode connected to the second node.

The bias gate signal may be the same as the initialization gate signal.

The pixel circuit may further include a second bias transistor including a gate electrode configured to receive the emission signal, a first electrode connected to the second node, and a second electrode connected to the fourth node.

According to embodiments, of the present disclosure, a display device may include a display panel including pixel circuits, and a display panel driver configured to drive the display panel, wherein each of the pixel circuits includes a first driving transistor including a gate electrode connected to a first node, a first electrode configured to receive a first power voltage, and a second electrode connected to a second node, a second driving transistor including a gate electrode connected to the second node, a first electrode configured to receive the first power voltage, a second electrode connected to the second node, and a back gate electrode connected to the first node, a write transistor including a gate electrode configured to receive a write gate signal, a first electrode configured to receive a data voltage, and a second electrode connected to the first node, an initialization transistor including a gate electrode configured to receive an initialization gate signal, a first electrode configured to receive an initialization voltage, and a second electrode connected to the second node, a storage capacitor including a first electrode connected to the first node, and a second electrode connected to the second node, and a light emitting element including a first electrode connected to the second node, and a second electrode configured to receive a second power voltage.

The first driving transistor may further include a back gate electrode connected to the second node.

The first driving transistor may further include a back gate electrode connected to the first node.

Each of the pixel circuits may further include an emission transistor configured to apply the first power voltage to the first driving transistor and to the second driving transistor in response to an emission signal.

Each of the pixel circuits may further include a reference transistor configured to apply a reference voltage to the first node in response to a reference gate signal.

Each of the pixel circuits may further include a hold capacitor including a first electrode configured to receive the first power voltage, and a second electrode connected to the second node.

Therefore, the pixel circuit may increase a driving range of a driving transistor by including a first driving transistor including a gate electrode connected to a first node, a first electrode configured to receive a first power voltage, and a second electrode connected to a second node, a second driving transistor including a gate electrode connected to the second node, a first electrode configured to receive the first power voltage, a second electrode connected to the second node, and a back gate electrode connected to the first node, a write transistor including a gate electrode configured to receive a write gate signal, a first electrode configured to receive a data voltage, and a second electrode connected to the first node, an initialization transistor including a gate electrode configured to receive an initialization gate signal, a first electrode configured to receive an initialization voltage, and a second electrode connected to the second node, a storage capacitor including a first electrode connected to the first node and a second electrode connected to the second node, and a light emitting element including a first electrode connected to the second node and a second electrode configured to receive a second power voltage.

In addition, the display device may reduce a change in a driving current according to a gate voltage of a driving transistor by including a pixel circuit having an increased driving range of the driving transistor.

Further, the display device may reduce mura caused by a deviation in threshold voltages of driving transistors of pixel circuits.

However, the aspects of the present disclosure are not limited to the above-described aspects, and may be variously expanded without departing from the spirit and scope of the present disclosure.

DETAILED DESCRIPTION

Figure 1:
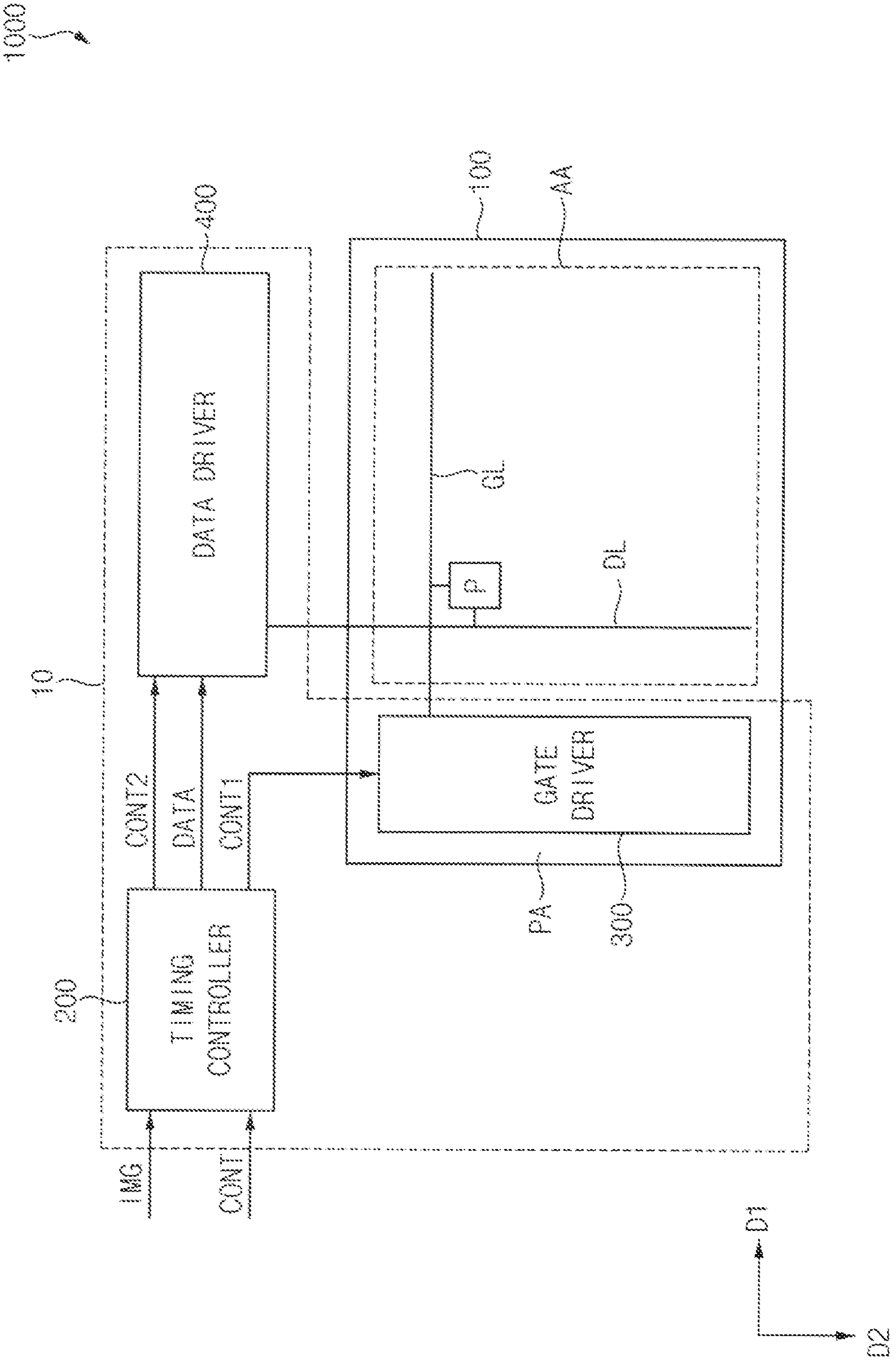
FIG. 1 is a block diagram illustrating a display device according to embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device 1000 according to embodiments of the present disclosure.

Referring to FIG. 1, the display device 1000 may include a display panel 100 and a display panel driver 10. The display panel driver 10 may include a timing controller 200, a gate driver 300, and a data driver 400. In one or more embodiments, the timing controller 200 and the data driver 400 may be integrated into one chip.

The display panel 100 has a display region AA on which an image is displayed, and a peripheral region PA adjacent to the display region AA. In one or more embodiments, the gate driver 300 may be mounted on the peripheral region PA of the display panel 100.

The display panel 100 may include a plurality of gate lines GL, a plurality of data lines DL, and a plurality of pixel circuits P electrically connected to the data lines DL and the gate lines GL. The gate lines GL may extend in a first direction D1, and the data lines DL may extend in a second direction D2 crossing the first direction D1.

The timing controller 200 may receive input image data IMG and an input control signal CONT from a host processor (e.g., a graphics processing unit; GPU). For example, the input image data IMG may include red image data, green image data and blue image data. In one or more embodiments, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT, and may output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT, and may output the second control signal CONT2 to the data driver 400. The second control signal CONT2 may include a horizontal start signal and a load signal.

The timing controller 200 may receive the input image data IMG and the input control signal CONT, and may generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

Figure 2:
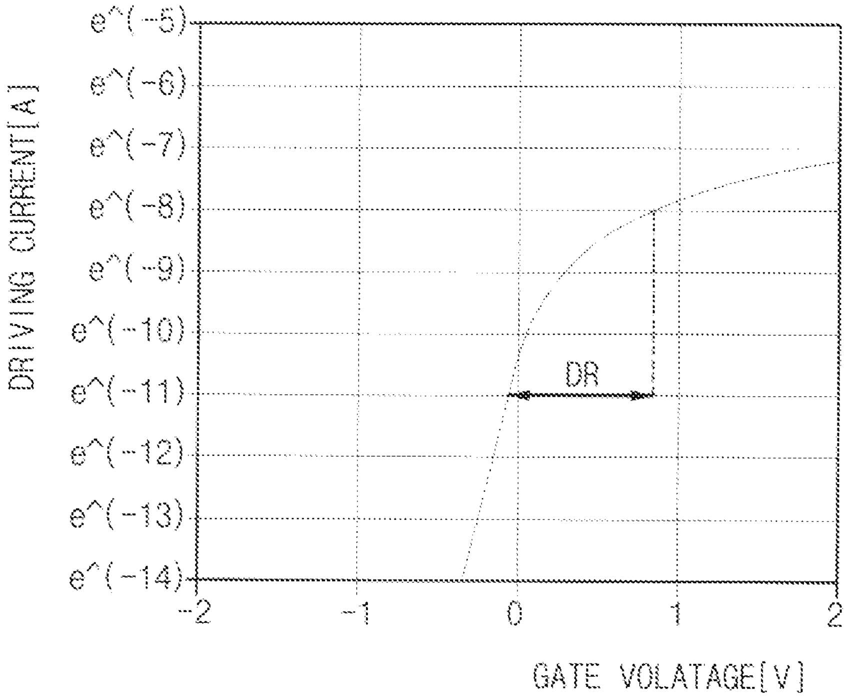
FIG. 2 is a graph for explaining a driving range.

FIG. 2 is a graph for explaining a driving range DR.

Referring to FIGS. 1 and 2, the driving transistor may have the driving range DR to express grayscale value. For example, when the display device 1000 displays 0 to 255 grayscale values, a range of a gate voltage of the driving transistor for displaying to 255 grayscale value may be the driving range DR.

For example, it is assumed that a driving current for displaying 0 grayscale value is e^(−11)[A] and the driving current for displaying 255 grayscale value is e^(−8)[A]. The driving range DR may be a range of the gate voltage for generating the driving current of e^(−11)[A] and the gate voltage for generating the driving current of e^(−8)[A].

Figure 3A:
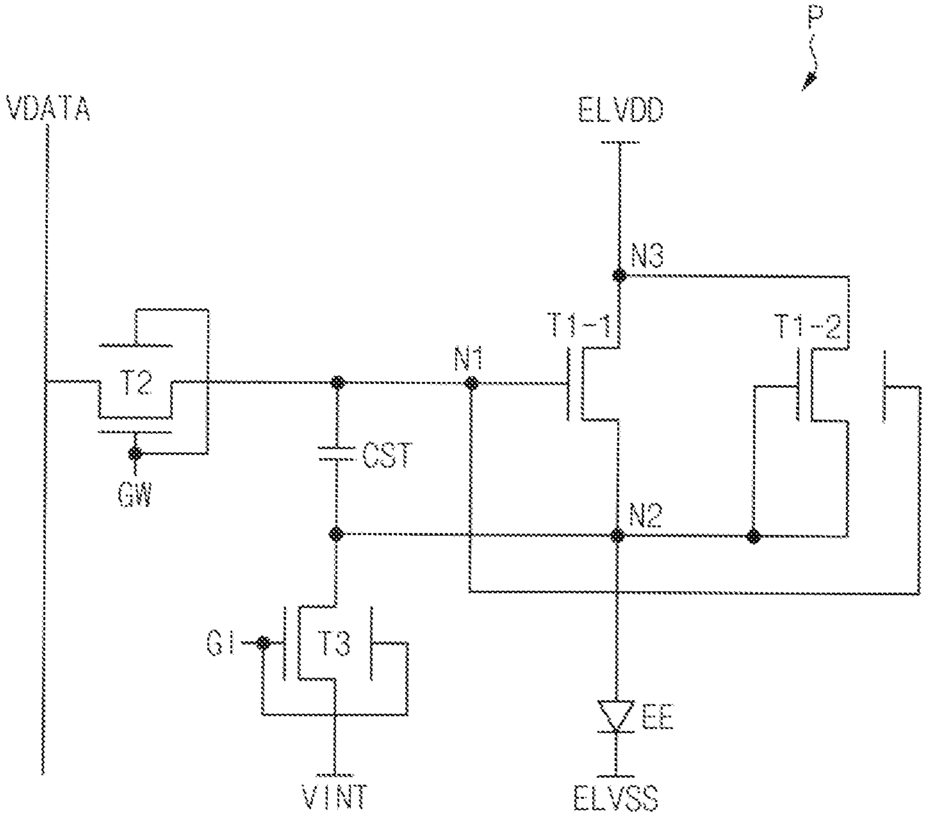
FIG. 3A is a circuit diagram illustrating an example of the pixel circuit of FIG. 1.

FIG. 3A is a circuit diagram illustrating an example of the pixel circuit P of FIG. 1.

Referring to FIG. 3A, the pixel circuit P may include a first driving transistor T1-1 including a gate electrode connected to a first node N1, a first electrode for receiving a first power voltage ELVDD (e.g., a high power voltage), and a second electrode connected to a second node N2, may include a second driving transistor T1-2 including a gate electrode connected to the second node N2, a first electrode for receiving the first power voltage ELVDD, a second electrode connected to the second node N2, and a back gate electrode connected to the first node N1, may include a write transistor T2 including a gate electrode for receiving a write gate signal GW, a first electrode for receiving a data voltage VDATA, and a second electrode connected to the first node N1, may include an initialization transistor T3 including a gate electrode for receiving an initialization gate signal GI, a first electrode for receiving an initialization voltage VINT, and a second electrode connected to the second node N2, may include a storage capacitor CST including a first electrode connected to the first node N1 and a second electrode connected to the second node N2, and may include a light emitting element EE including a first electrode connected to the second node N2 and a second electrode for receiving a second power voltage ELVSS (e.g., a low power voltage).

Here, the second power voltage ELVSS may be less than the first power voltage ELVDD. For example, the light emitting element EE may be an organic light emitting diode.

In one or more embodiments, the write transistor T2 may further include a back gate electrode connected to the gate electrode of the write transistor T2. In one or more embodiments, the initialization transistor T3 may further include a back gate electrode connected to the gate electrode of the initialization transistor T3.

The initialization transistor T3 may apply the initialization voltage VINT to the second node N2 in response to the initialization gate signal GI. Accordingly, the first electrode (e.g., an anode electrode) of the light emitting element EE may be initialized.

The data driver (400 of FIG. 1) may sense electrical characteristics of the driving transistors T1-1 and T1-2 through a sensing current. For example, the electrical characteristics of the driving transistors T1-1 and T1-2 may be mobility of the driving transistors T1-1 and T1-2. For example, the electrical characteristics of the driving transistors T1-1 and T1-2 may be threshold voltages of the driving transistors T1-1 and T1-2.

The data driver (400 of FIG. 1) may sense the electrical characteristics of the light emitting element EE through the sensing current. For example, the electrical characteristic of the light emitting element EE may be capacitance at both ends of the light emitting element EE.

The write transistor T2 may apply the data voltage VDATA to the first node N1 in response to the write gate signal GW. The data voltage VDATA applied to the first node N1 may be written in the storage capacitor CST.

The first driving transistor T1-1 may generate a first driving current corresponding to a voltage of the first node N1 (e.g., a gate voltage of the first driving transistor T1-1). The second driving transistor T1-2 may generate a second driving current corresponding to a voltage of the first node N1 (e.g., a back gate voltage of the second driving transistor T1-2).

The first driving current and the second driving current may be applied to the light emitting element EE, and the light emitting element EE may emit light with a luminance according to the first and second driving currents.

The transistor may generate a current corresponding to the gate voltage, or may generate a current corresponding to the back gate voltage. However, a slope of a back gate voltage-driving current graph with respect to the current corresponding to the back gate voltage may be less than a slope of a gate voltage-driving current graph with respect to the current corresponding to the gate voltage. Accordingly, by using the first driving transistor T1-1 generating a current corresponding to the gate voltage, and by using the second driving transistor T1-2 generating a current corresponding to the back gate voltage together, the driving range (DR of FIG. 2) may be increased.

When the driving range (DR of FIG. 2) is increased, a change in the driving current (e.g., a sum of the first driving current and the second driving current) according to the voltage of the first node N1 may be reduced. Accordingly, mura caused by a deviation in the threshold voltages of the driving transistors T1-1 and T1-2 may be reduced.

Figure 3B:
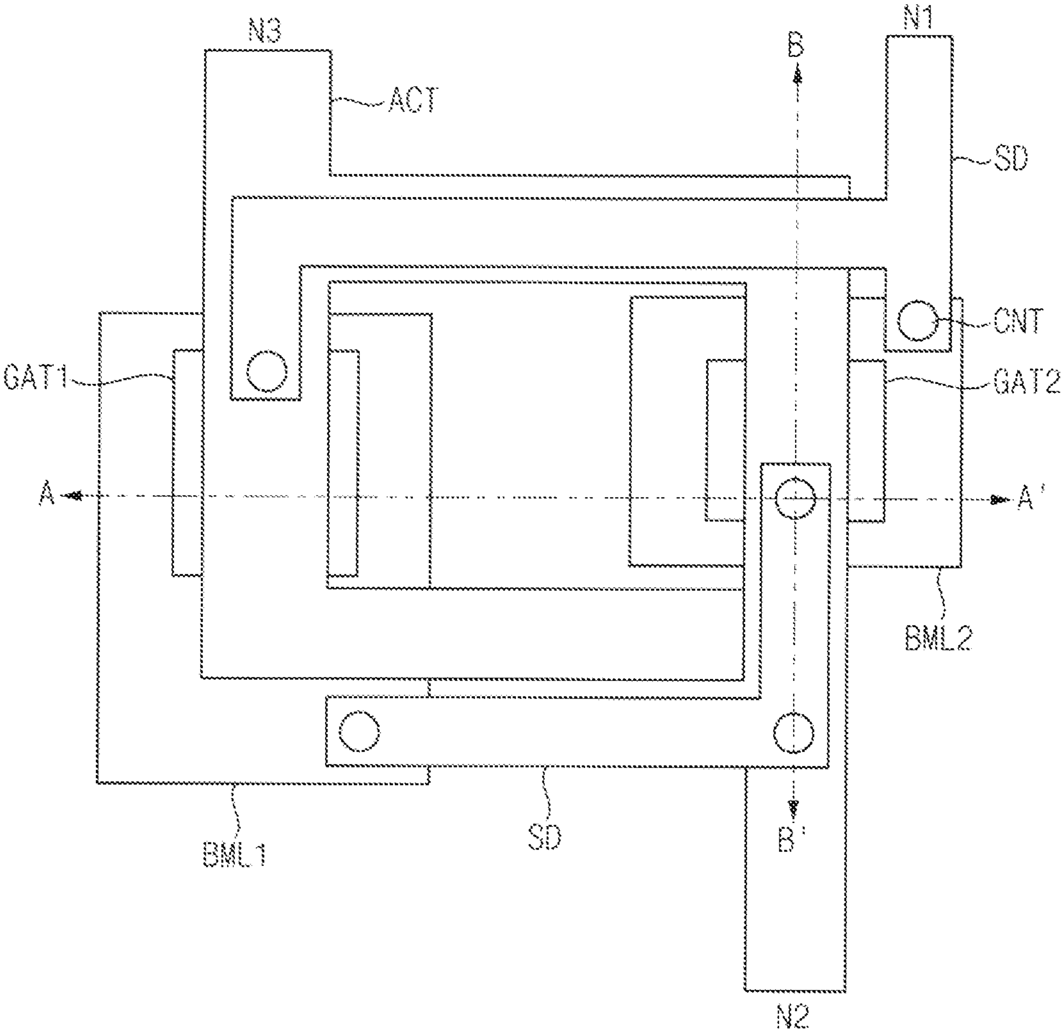
FIG. 3B is a plan view illustrating an example of driving transistors of the pixel circuit of FIG. 1.
Figure 3C:
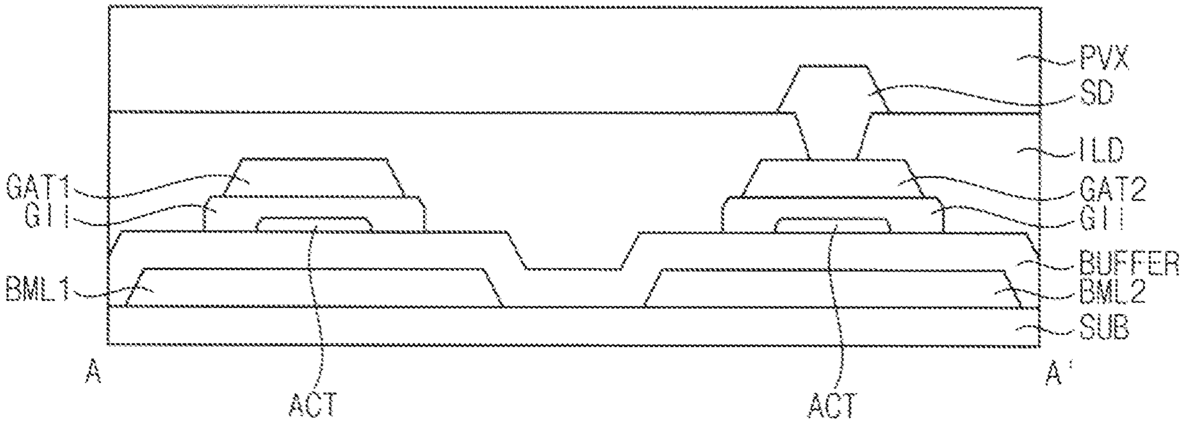
FIGS. 3C and 3D are cross-sectional views illustrating an example of driving transistors of the pixel circuit of FIG. 1.
Figure 3D:
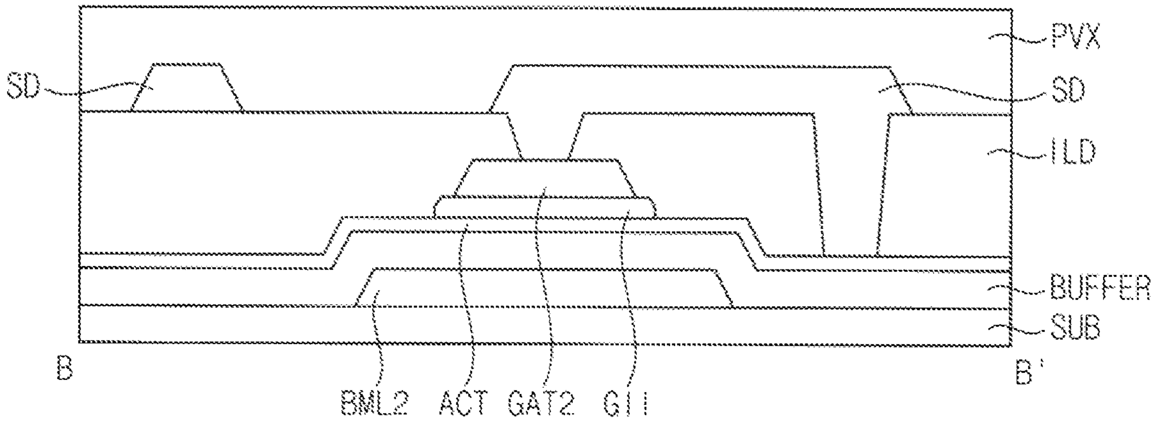

FIG. 3B is a plan view illustrating an example of the driving transistors T1-1 and T1-2 of the pixel circuit P of FIG. 1, and FIGS. 3C and 3D are cross-sectional views illustrating an example of the driving transistors T1-1 and T1-2 of the pixel circuit P of FIG. 1. FIG. 3C is a cross-sectional view taken along the line A-A' of FIG. 3B. FIG. 3D is a cross-sectional view taken along the line B-B' of FIG. 3B. However, FIGS. 3B to 3D do not illustrate the storage capacitor CST.

Referring to FIGS. 3A to 3D, the driving transistors T1-1 and T1-2 may include a substrate SUB, a back gate electrode BML1 of the first driving transistor T1-1, a back gate electrode BML2 of the second driving transistor T1-2, a buffer layer BUFFER, an active layer ACT, a gate insulating layer GII, the gate electrode GAT1 of the first driving transistor T1-1, the gate electrode GAT2 of the second driving transistor T1-2, an interlayer insulating layer ILD, a conductive layer SD, and a passivation layer PVX. The connected components may be connected through a contact hole CNT.

The substrate SUB may be formed of a transparent or opaque material. Examples of the material that can be used as the substrate SUB may include glass, quartz, plastic, and the like. These may be used alone or in combination with each other. In one or more embodiments, the substrate SUB may include polyimide PI. In this case, the substrate SUB may have a structure in which one or more polyimide layers and one or more barrier layers are alternately stacked.

The buffer layer BUFFER may be formed on the back gate electrodes BML1 and BML2 while covering the back gate electrodes BML1 and BML2.

The buffer layer BUF may include an inorganic insulating material. Examples of the material that can be used as the buffer layer BUF may include silicon oxide (SiOx), silicon nitride (SiNx), silicon oxynitride (SiON), and the like. These may be used alone or in combination with each other.

For example, the back gate electrodes BML1 and BML2 may be formed of titanium (Ti), copper (Cu), or the like. The back gate electrodes BML1 and BML2 may be formed of a metal, an alloy, a conductive metal oxide, a transparent conductive material, or the like. For example, examples of materials that can be used as the back gate electrodes BML1 and BML2 may include silver (Ag), an alloy containing silver, molybdenum (Mo), an alloy containing molybdenum, aluminum (Al), alloys containing aluminum, aluminum nitride (AlN), tungsten (W), tungsten nitride (WN), copper (Cu), nickel (Ni), chromium (Cr), chromium nitride (CrN), titanium (Ti)), tantalum (Ta), platinum (Pt), scandium (Sc), indium tin oxide (ITO), indium zinc oxide (IZO), and the like. These may be used alone or in combination with each other.

The active layer ACT may be formed on the buffer layer BUFFER to provide a channel region, a source region, and a drain region. A central region (e.g., protruding regions of FIGS. 3B and 3C) may correspond to the channel region, and a peripheral region may correspond to the source region and the drain region. For example, the active layer ACT may be formed of a silicon semiconductor or an oxide semiconductor.

Examples of the material that can be used as the silicon semiconductor may include amorphous silicon, polycrystalline silicon, and the like. These may be used alone or in combination with each other.

Examples of materials that can be used as the oxide semiconductor may include zinc oxide (ZnOx), gallium oxide (GaOx), titanium oxide (TiOx), tin oxide (SnOx), indium oxide (InOx), indium-gallium oxide (IGO), Indium-zinc oxide (IZO), indium-tin oxide (ITO), gallium-zinc oxide (GZO), zinc-magnesium oxide (ZMO), zinc-tin oxide (ZTO), zinc-zirconium oxide (ZnZrxOy), indium-Gallium-zinc oxide (IGZO), indium-zinc-tin oxide (IZTO), indium-gallium-hafnium oxide (IGHO), tin-aluminum-zinc oxide (TAZO), indium-gallium-tin oxide (IGTO), etc. These may be used alone or in combination with each other.

The gate insulating layer GII may be formed on the active layer ACT, and may cover a portion of the active layer ACT. The gate insulating layer GII may be formed of an insulating material. For example, examples of the insulating material that can be used as the gate insulating layer GII may include silicon oxide (SiOx), silicon nitride (SiNx), silicon oxynitride (SiON), or the like. These may be used alone or in combination with each other.

The gate insulating layer GII and the buffer layer BUFFER may be insulating layers. Accordingly, when a thickness of the gate insulating layer GII and the buffer layer BUFFER are increased, an electric field formed may be reduced. Accordingly, by increasing the thickness of the gate insulating layer GII and the buffer layer BUFFER, the driving range (DR of FIG. 2) may be increased.

The gate electrode GAT1 of the first driving transistor T1-1 and the gate electrode GAT2 of the second driving transistor T1-2 may be formed on the gate insulating layer GII. The gate electrodes GAT1 and GAT2 may be formed of a metal, an alloy, a conductive metal oxide, a transparent conductive material, or the like. For example, examples of materials that can be used as the gate electrodes GAT1 and GAT2 may include silver (Ag), an alloy containing silver, molybdenum (Mo), an alloy containing molybdenum, aluminum (Al), alloys containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like. These may be used alone or in combination with each other.

The interlayer insulating layer ILD may be formed on the gate electrode GAT1 of the first driving transistor T1-1, the gate electrode GAT2 of the second driving transistor T1-2, the gate insulating layer GII, and the active layer ACT while covering the active layer ACT. Examples of the material that can be used as the interlayer insulating layer (ILD) may include silicon oxide (SiOx), silicon nitride (SiNx), silicon oxynitride (SiON), and the like. These may be used alone or in combination with each other.

The passivation layer PVX may be formed on the interlayer insulating layer ILD. The passivation layer PVX may include an inorganic insulating material. Examples of the material that can be used as the passivation layer (PVX) may include silicon oxide (SiOx), silicon nitride (SiNx), silicon oxynitride (SiON), and the like.

The gate electrode GAT1 of the first driving transistor T1-1 may be connected to the back gate electrode BML2 of the second driving transistor T1-2 through the conductive layer SD. The back gate electrode BML1 of the first driving transistor T1-1 and the gate electrode GAT2 of the second driving transistor T1-2 may be connected to the second node N2 through the conductive layer SD. In one or more embodiments, each of the conductive layers SD may include a metal, an alloy, a metal oxide, a transparent conductive material, or the like. Examples of the material that can be used as the conductive layer SD may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), indium tin oxide (ITO), and the like.

Figure 4:
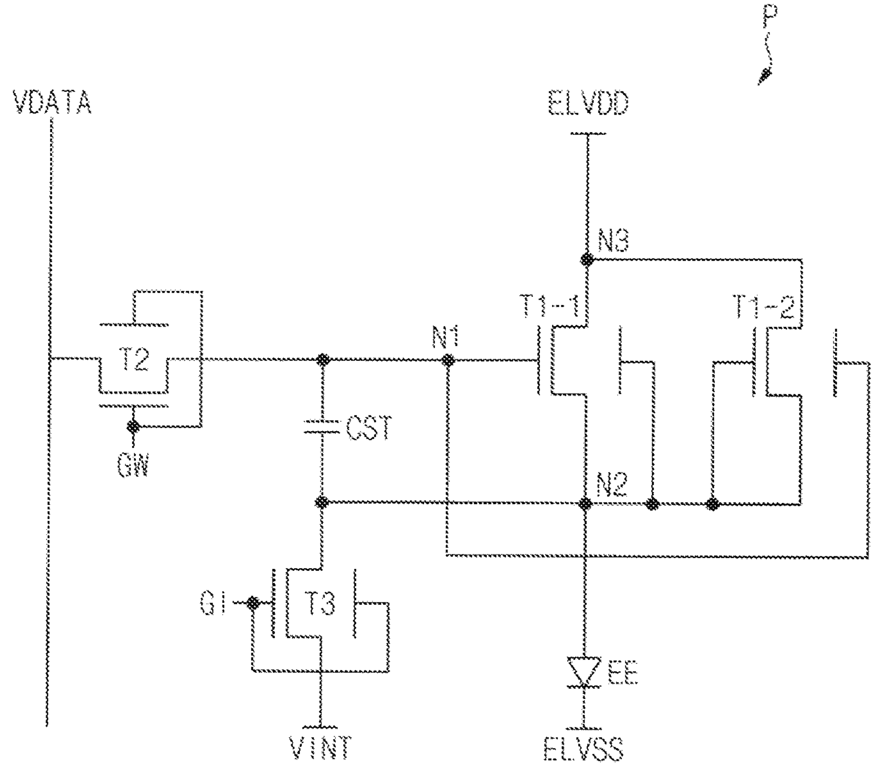
FIGS. 4 to 14 are circuit diagrams respectively illustrating an example of a pixel circuit according to embodiments of the present disclosure.

FIG. 4 is a circuit diagram illustrating an example of the pixel circuit P according to embodiments of the present disclosure.

The pixel circuit P according to one or more embodiments is substantially the same as the pixel circuit P of FIG. 1 with the exception of a back gate electrode of the first driving transistor T1-1. Thus, the same reference numerals are used to refer to the same or similar element, and any repetitive explanation will be omitted.

Referring to FIG. 4, the first driving transistor T1-1 may further include the back gate electrode connected to the second node N2. As a voltage is applied to the back gate electrode of the first driving transistor T1-1, a change in the first driving current according to the gate voltage of the first driving transistor T1-1 may be reduced.

Figure 5:
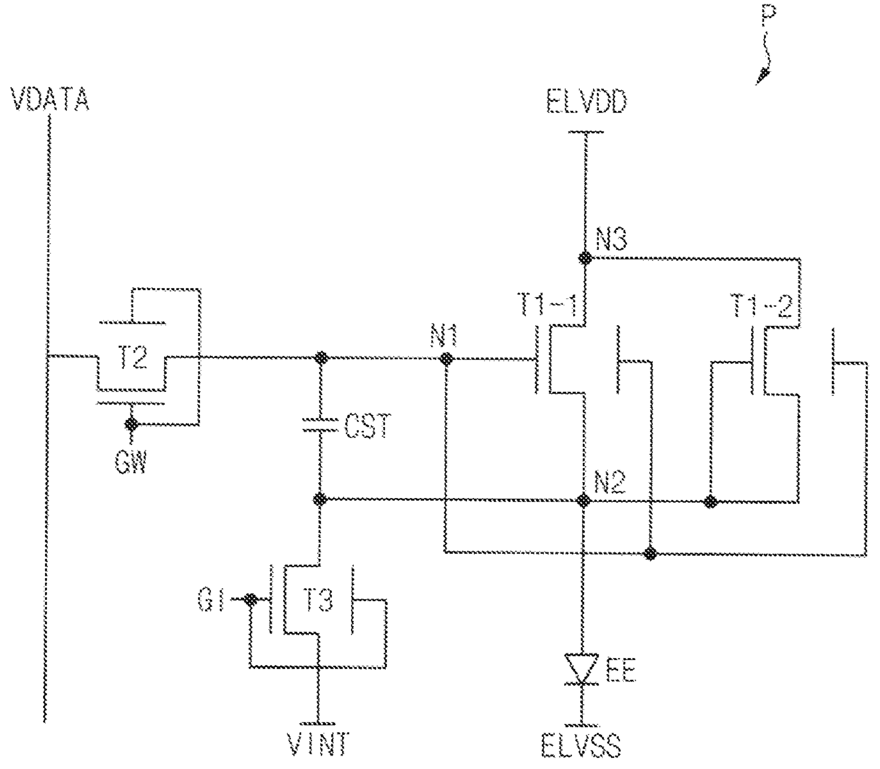

FIG. 5 is a circuit diagram illustrating an example of the pixel circuit P according to embodiments of the present disclosure.

The pixel circuit P according to one or more embodiments is substantially the same as the pixel circuit P of FIG. 1 with the exception of the back gate electrode of the first driving transistor T1-1. Thus, the same reference numerals are used to refer to the same or similar element, and any repetitive explanation will be omitted.

Referring to FIG. 5, the first driving transistor T1-1 may further include the back gate electrode connected to the first node N1. As a voltage is applied to the back gate electrode of the first driving transistor T1-1, a change in the first driving current according to the gate voltage of the first driving transistor T1-1 may be reduced.

Figure 6:
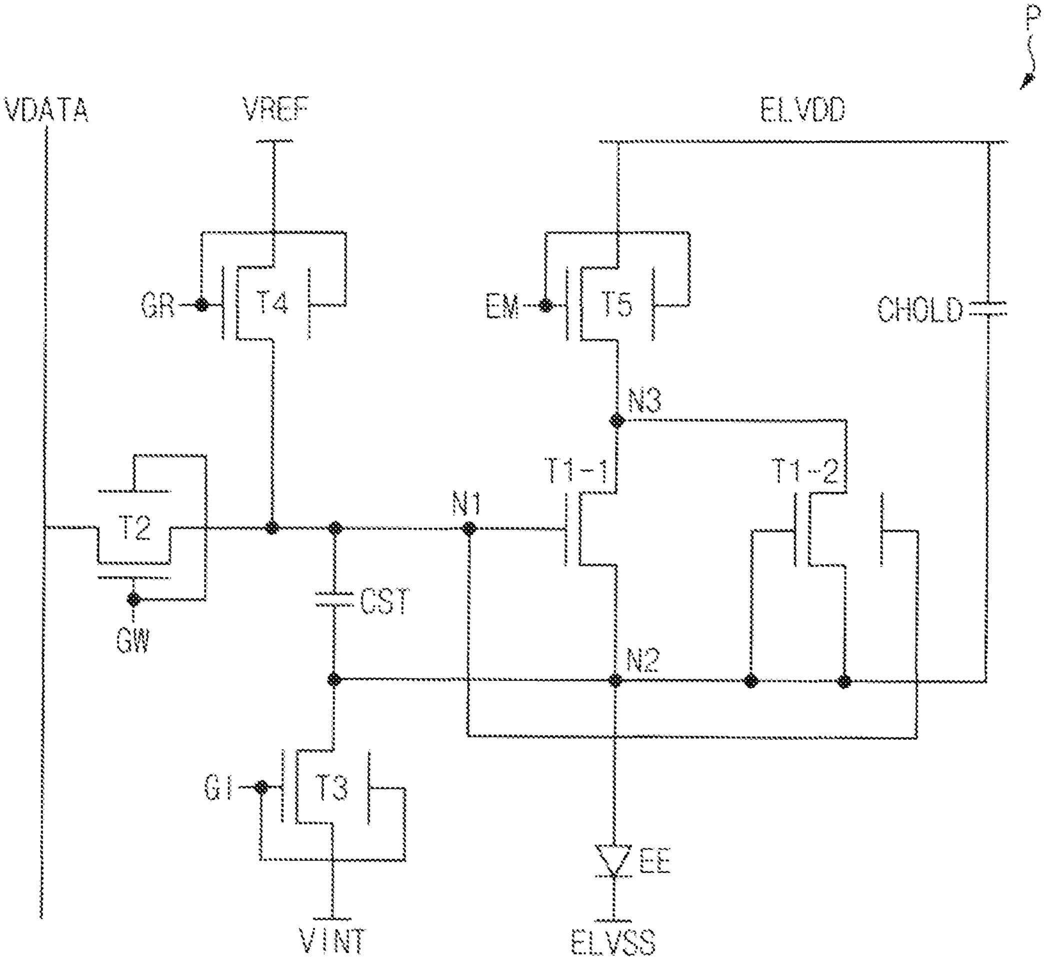

FIG. 6 is a circuit diagram illustrating an example of the pixel circuit P according to embodiments of the present disclosure.

The pixel circuit P according to one or more embodiments is substantially the same as the pixel circuit P of FIG. 1 with the exception of a reference transistor T4, an emission transistor T5, and a hold capacitor CHOLD. Thus, the same reference numerals are used to refer to the same or similar elements, and any repetitive explanation will be omitted.

Referring to FIG. 6, the pixel circuit P may further include the reference transistor T4 for applying a reference voltage VREF to the first node N1 in response to a reference gate signal GR. The pixel circuit P may further include the emission transistor T5 for applying the first power voltage ELVDD to the first driving transistor T1-1 and to the second driving transistor T2-2 in response to the emission signal EM. The pixel circuit P may further include the hold capacitor CHOLD including a first electrode for receiving the first power voltage ELVDD, and a second electrode connected to the second node N2.

The reference transistor T4 may include a gate electrode for receiving the reference gate signal GR, a first electrode for receiving the reference voltage VREF, and a second electrode connected to the first node N1. The emission transistor T5 may include a gate electrode for receiving the emission signal EM, a first electrode for receiving the first power voltage ELVDD, and a second electrode connected to the second node N2.

In one or more embodiments, the reference transistor T4 may further include a back gate electrode connected to the gate electrode of the reference transistor T4. In one or more embodiments, the emission transistor T5 may further include a back gate electrode connected to the gate electrode of the emission transistor T5.

The reference transistor T4 may apply the reference voltage VREF to the first node N1 in response to the reference gate signal GR. Accordingly, the voltage of the first node N1 may be initialized.

The emission transistor T5 may apply the first power voltage ELVDD to the first driving transistor T1-1 and to the second driving transistor T2-2 in response to the emission signal EM. The first driving transistor T1-1 and the second driving transistor T2-2 may receive the first power voltage ELVDD to generate the driving currents.

Figure 7:
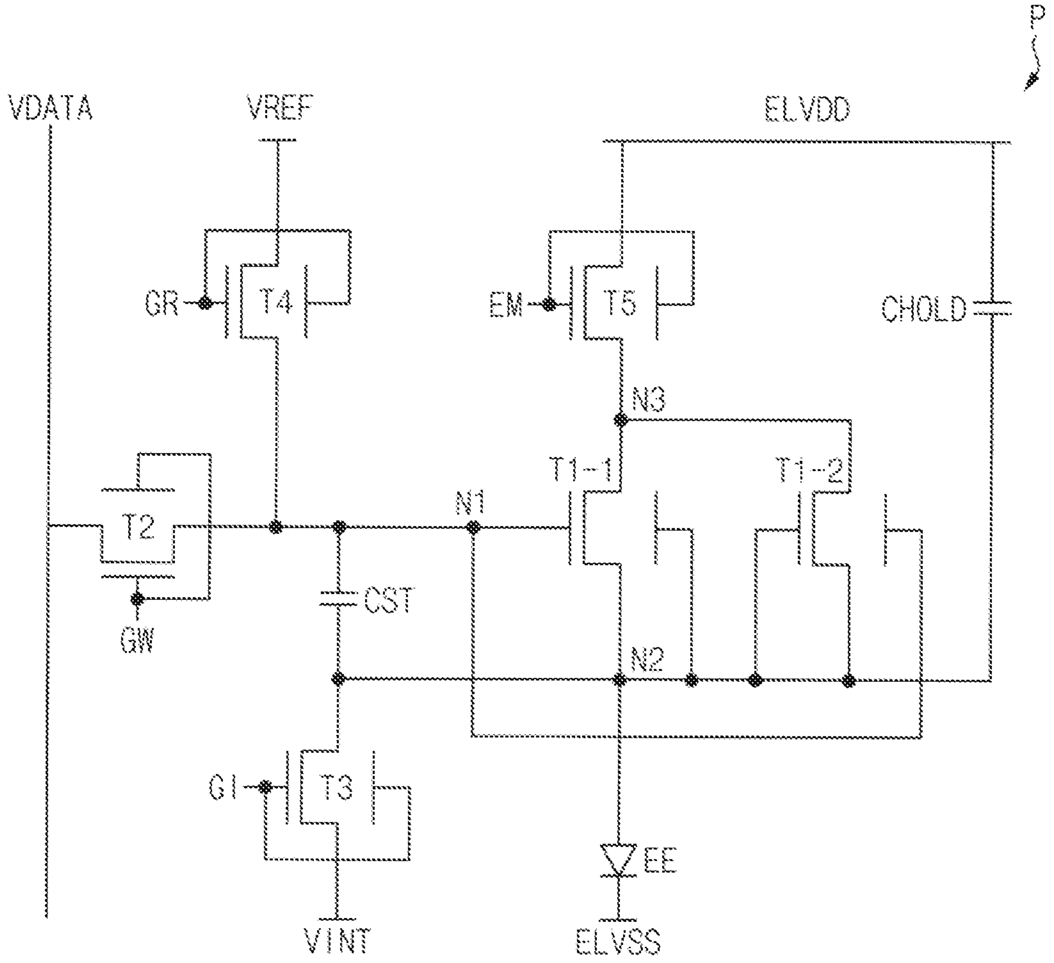

FIG. 7 is a circuit diagram illustrating an example of the pixel circuit P according to embodiments of the present disclosure.

The pixel circuit P according to one or more embodiments is substantially the same as the pixel circuit P of FIG. 6 with the exception of the back gate electrode of the first driving transistor T1-1. Thus, the same reference numerals are used to refer to the same or similar element, and any repetitive explanation will be omitted.

Referring to FIG. 7, the first driving transistor T1-1 may further include the back gate electrode connected to the second node N2. As a voltage is applied to the back gate electrode of the first driving transistor T1-1, a change in the first driving current according to the gate voltage of the first driving transistor T1-1 may be reduced.

Figure 8:
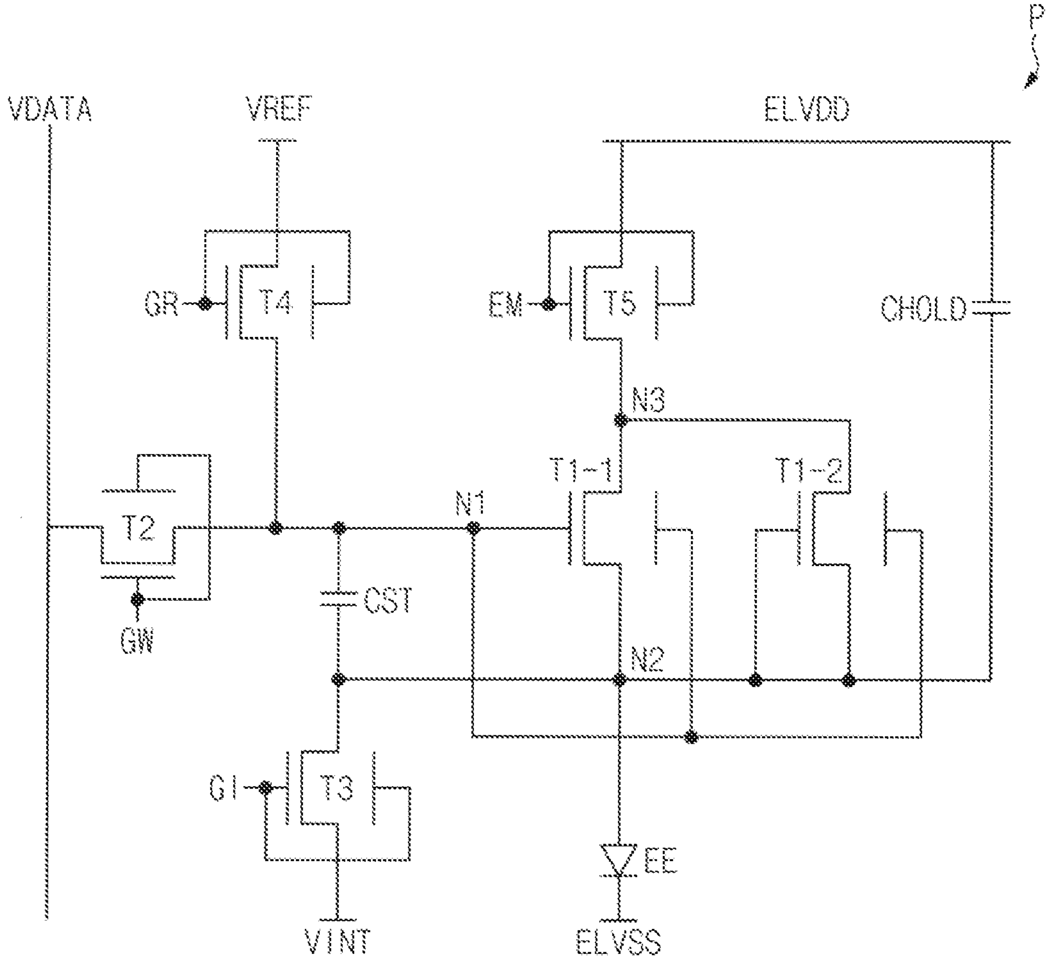

FIG. 8 is a circuit diagram illustrating an example of the pixel circuit P according to embodiments of the present disclosure.

The pixel circuit P according to one or more embodiments is substantially the same as the pixel circuit P of FIG. 6 with the exception of the back gate electrode of the first driving transistor T1-1. Thus, the same reference numerals are used to refer to the same or similar element, and any repetitive explanation will be omitted.

Referring to FIG. 8, the first driving transistor T1-1 may further include the back gate electrode connected to the first node N1. As a voltage is applied to the back gate electrode of the first driving transistor T1-1, a change in the first driving current according to the gate voltage of the first driving transistor T1-1 may be reduced.

Figure 9:
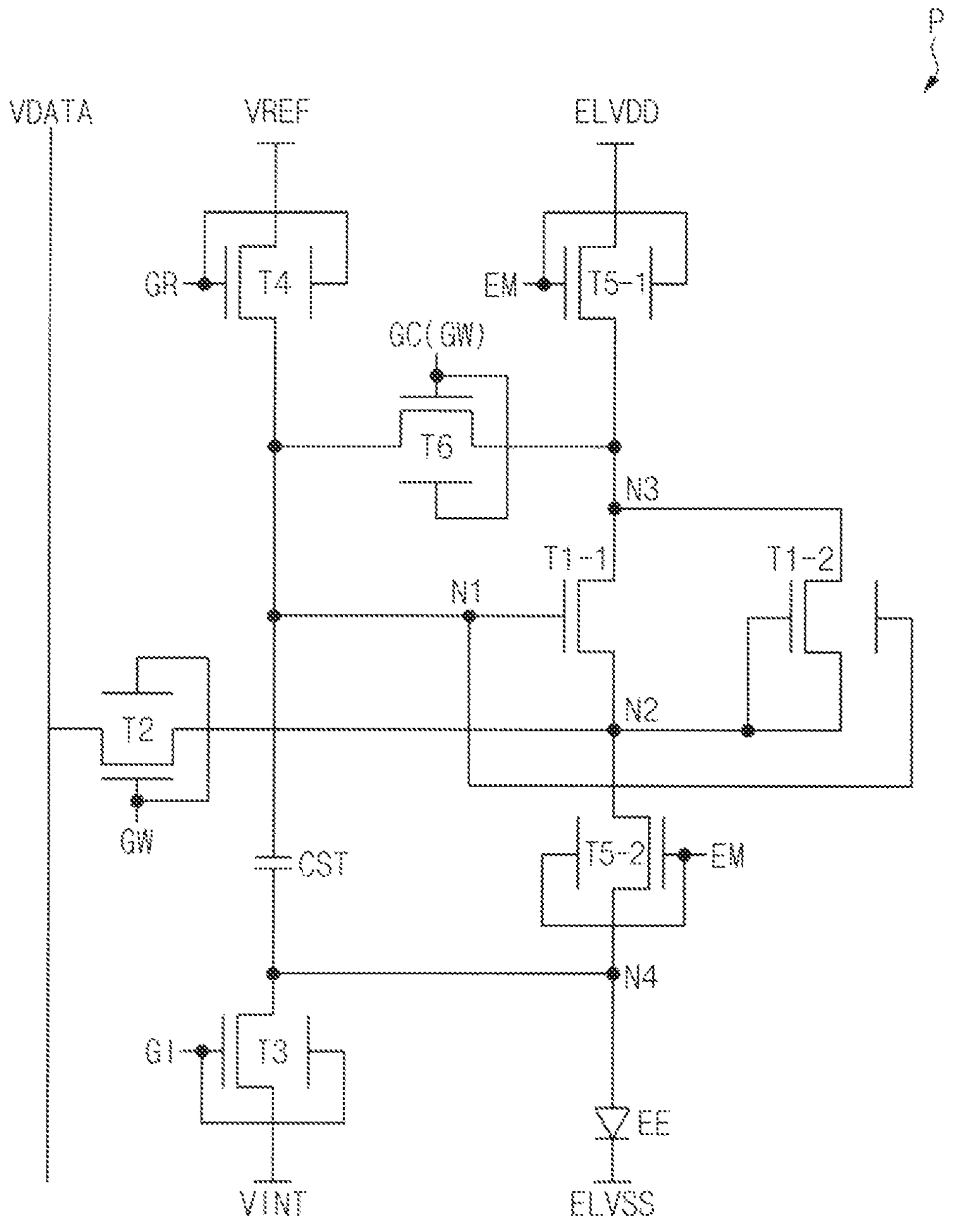

FIG. 9 is a circuit diagram illustrating an example of the pixel circuit P according to embodiments of the present disclosure.

Referring to FIG. 9, the pixel circuit P may include a first driving transistor T1-1 including a gate electrode connected to a first node N1, a first electrode for receiving the first power voltage ELVDD, and a second electrode connected to a second node N2, may include a second driving transistor T1-2 including a gate electrode connected to the second node, a first electrode connected to the third node, a second electrode connected to the second node, and a back gate electrode connected to the first node N1, may include a write transistor T2 including a gate electrode for receiving the write gate signal GW, a first electrode for receiving the data voltage VDATA, and a second electrode connected to the second node N2, may include an initialization transistor T3 including a gate electrode for receiving the initialization gate signal GI, a first electrode for receiving the initialization voltage VINT, and a second electrode connected to a fourth node N4, may include a storage capacitor CST including a first electrode connected to the first node N1 and a second electrode connected to the fourth node N4, may include a compensation transistor T3 including a gate electrode for receiving a compensation gate signal GC, a first electrode connected to the third node N3, and a second electrode connected to the first node N1, may include a first emission transistor T5-1 including a gate electrode for receiving the emission signal EM, a first electrode for receiving the first power voltage ELVDD, and a second electrode connected to the third node N3, may include a second emission transistor T5-2 including a gate electrode for receiving the emission signal EM, a first electrode connected to the second node N2, and a second electrode connected to the fourth node N4, and may include a light emitting element EE including a first electrode connected to the fourth node N4 and a second electrode for receiving the second power voltage ELVSS.

In one or more embodiments, the write transistor T2 may further include the back gate electrode connected to the gate electrode of the write transistor T2. In one or more embodiments, the initialization transistor T3 may further include the back gate electrode connected to the gate electrode of the initialization transistor T3. In one or more embodiments, the reference transistor T4 may further include the back gate electrode connected to the gate electrode of the reference transistor T4. In one or more embodiments, the first emission transistor T5-1 may further include a back gate electrode connected to the gate electrode of the first emission transistor T5-1. In one or more embodiments, the second emission transistor T5-2 may further include a back gate electrode connected to the gate electrode of the second emission transistor T5-2. In one or more embodiments, the compensation transistor T6 may further include a back gate electrode connected to the gate electrode of the compensation transistor T6.

The initialization transistor T3 may apply the initialization voltage VINT to the fourth node N4 in response to the initialization gate signal GI. Accordingly, the first electrode (e.g., the anode electrode) of the light emitting element EE may be initialized.

The reference transistor T4 may apply the reference voltage VREF to the first node N1 in response to the reference gate signal GR. Accordingly, the voltage of the first node N1 may be initialized.

The write transistor T2 may apply the data voltage VDATA to the second node N2 in response to the write gate signal GW. The data voltage VDATA applied to the second node N2 may be written to the storage capacitor CST through the driving transistors T1-1 and T1-2 and the compensation transistor T6.

In one or more embodiments, the compensation gate signal GC may be the same as the write gate signal GW. Accordingly, the write transistor T2 and the compensation transistor T6 may be substantially simultaneously turned on.

The first emission transistor T5-1 may apply the first power voltage ELVDD to the first driving transistor T1-1 and the second driving transistor T2-2 in response to the emission signal EM. The first driving transistor T1-1 and the second driving transistor T2-2 may receive the first power voltage ELVDD to generate the driving currents.

The first driving transistor T1-1 may generate the first driving current corresponding to the voltage of the first node N1 (e.g., the gate voltage of the first driving transistor T1-1). The second driving transistor T1-2 may generate the second driving current corresponding to the voltage of the first node N1 (e.g., the back gate voltage of the second driving transistor T1-2).

The second emission transistor T5-2 may apply the first driving current and the second driving current to the light emitting element EE in response to the emission signal EM. The first driving current and the second driving current may be applied to the light emitting element EE, and the light emitting element EE may emit light with a luminance according to the first and second driving currents.

Figure 10:
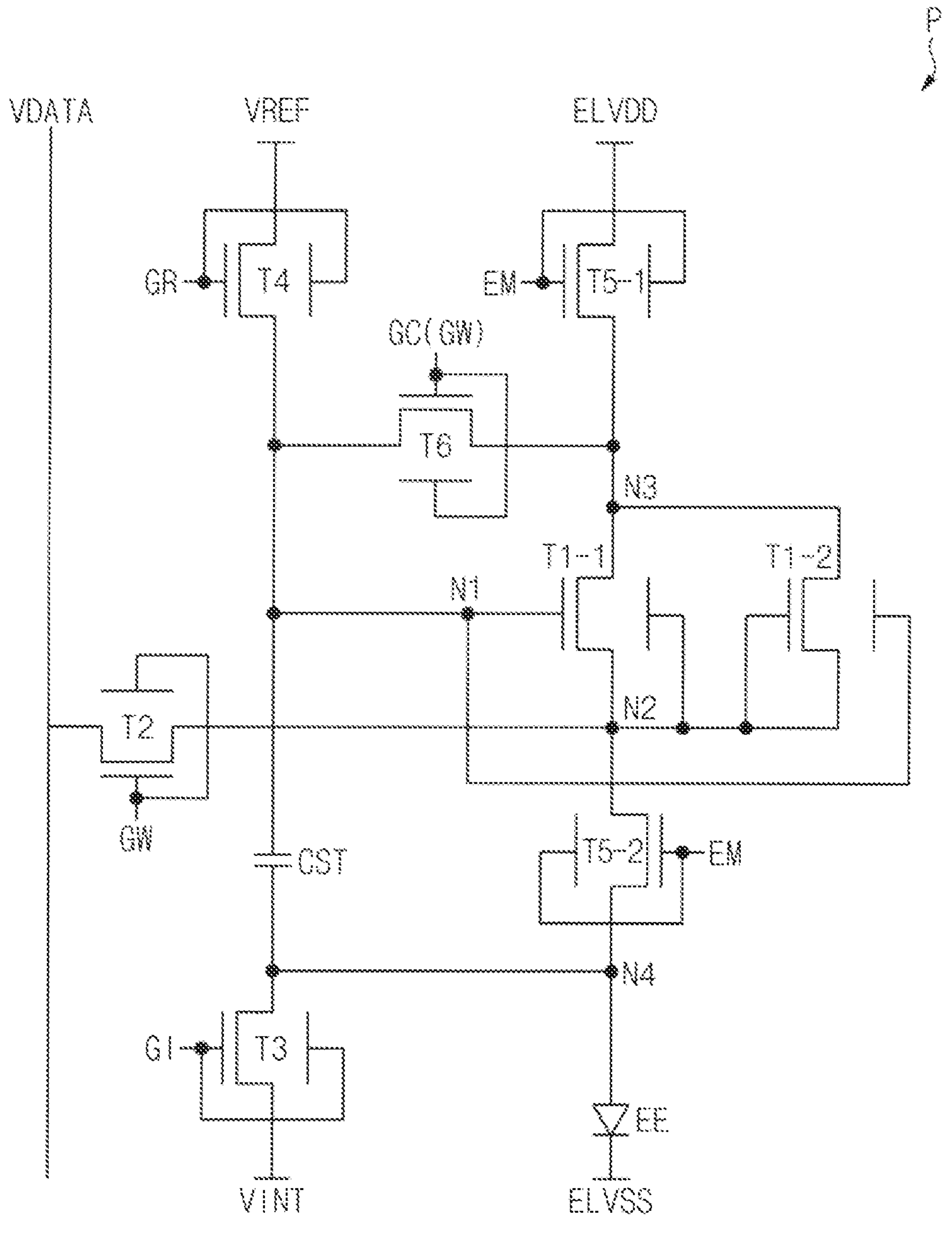

FIG. 10 is a circuit diagram illustrating an example of the pixel circuit P according to embodiments of the present disclosure.

The pixel circuit P according to one or more embodiments is substantially the same as the pixel circuit P of FIG. 9 with the exception of the back gate electrode of the first driving transistor T1-1. Thus, the same reference numerals are used to refer to the same or similar element, and any repetitive explanation will be omitted.

Referring to FIG. 10, the first driving transistor T1-1 may further include the back gate electrode connected to the second node N2. As a voltage is applied to the back gate electrode of the first driving transistor T1-1, a change in the first driving current according to the gate voltage of the first driving transistor T1-1 may be reduced.

Figure 11:
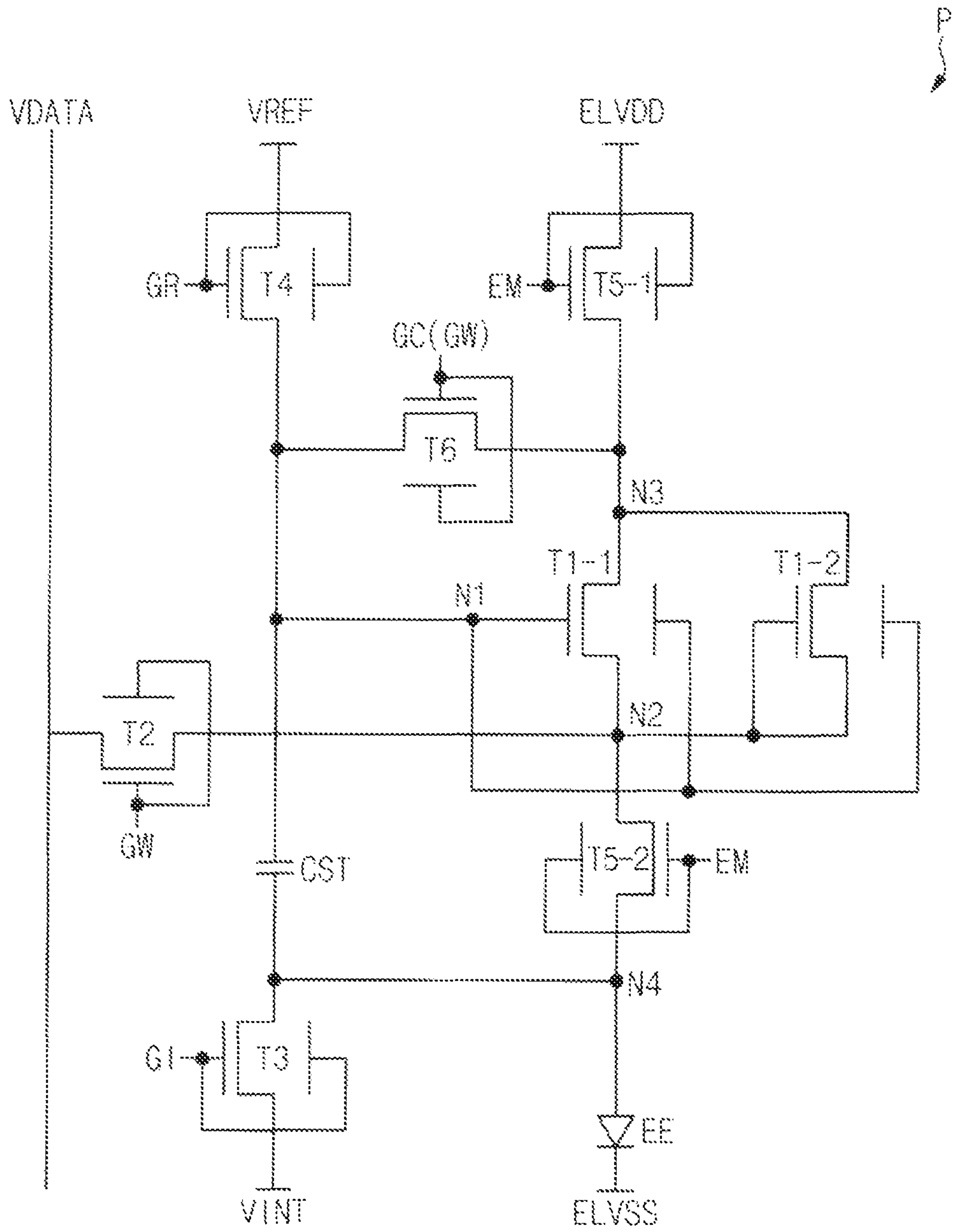

FIG. 11 is a circuit diagram illustrating an example of the pixel circuit P according to embodiments of the present disclosure.

The pixel circuit P according to one or more embodiments is substantially the same as the pixel circuit P of FIG. 9 with the exception of the back gate electrode of the first driving transistor T1-1. Thus, the same reference numerals are used to refer to the same or similar element, and any repetitive explanation will be omitted.

Referring to FIG. 11, the first driving transistor T1-1 may further include the back gate electrode connected to the first node N1. As a voltage is applied to the back gate electrode of the first driving transistor T1-1, a change in the first driving current according to the gate voltage of the first driving transistor T1-1 may be reduced.

Figure 12:
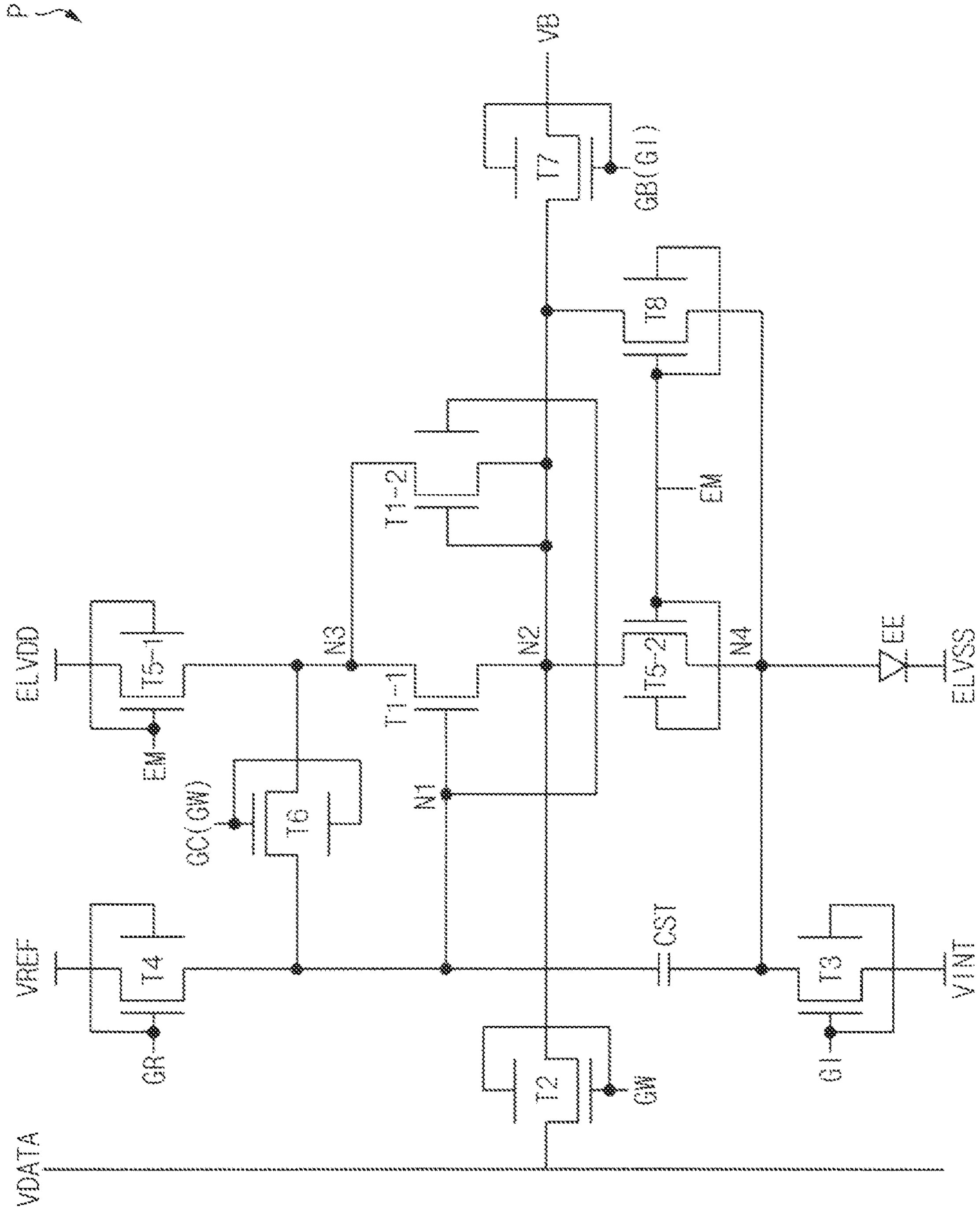

FIG. 12 is a circuit diagram illustrating an example of the pixel circuit P according to embodiments of the present disclosure.

The pixel circuit P according to one or more embodiments is substantially the same as the pixel circuit P of FIG. 9 with the exception of a first bias transistor T7 and a second bias transistor T8. Thus, the same reference numerals are used to refer to the same or similar element, and any repetitive explanation will be omitted.

Referring to FIG. 12, the pixel circuit P may include the first bias transistor T7 including a gate electrode for receiving the bias gate signal GB, a first electrode for receiving a bias voltage VB, and a second electrode connected to the second node N2. The pixel circuit P may include the second bias transistor T8 including a gate electrode for receiving the emission signal EM, a first electrode connected to the second node N2, and a second electrode connected to the fourth node N4.

In one or more embodiments, the first bias transistor T7 may include a back gate electrode connected to the gate electrode of the first bias transistor T7. In one or more embodiments, the second bias transistor T8 may include a back gate electrode connected to the gate electrode of the second bias transistor T8.

The first bias transistor T7 may apply the bias voltage VB to the second node N2 in response to the bias gate signal GB. Accordingly, hysteresis characteristics of the first driving transistor T1-1 and the second driving transistor T2-2 may be initialized.

The second bias transistor T8 may apply the first driving current and the second driving current to the light emitting element EE in response to the emission signal EM.

Figure 13:
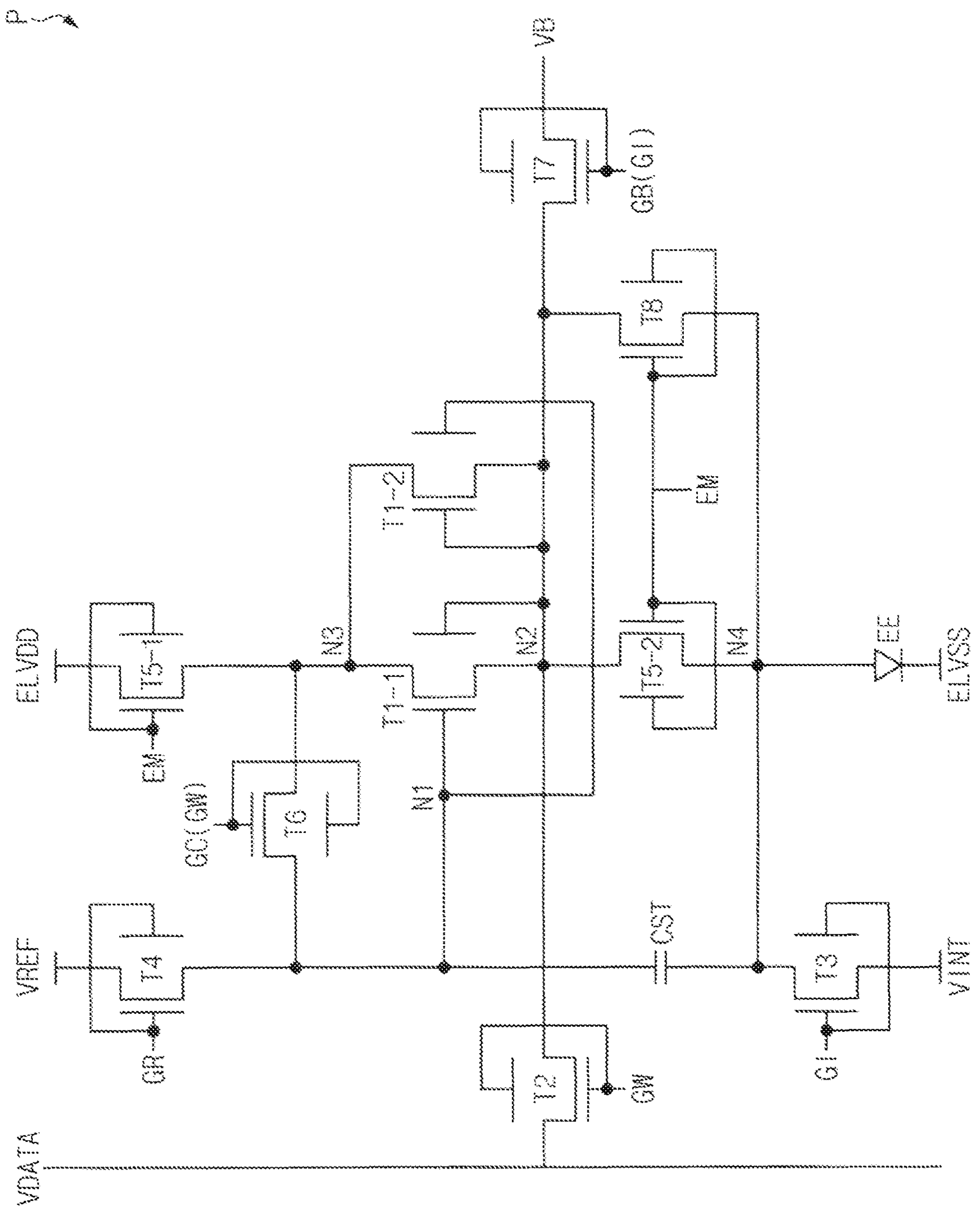

FIG. 13 is a circuit diagram illustrating an example of the pixel circuit P according to embodiments of the present disclosure.

The pixel circuit P according to one or more embodiments is substantially the same as the pixel circuit P of FIG. 12 with the exception of the back gate electrode of the first driving transistor T1-1. Thus, the same reference numerals are used to refer to the same or similar element, and any repetitive explanation will be omitted.

Referring to FIG. 13, the first driving transistor T1-1 may further include the back gate electrode connected to the second node N2. As a voltage is applied to the back gate electrode of the first driving transistor T1-1, a change in the first driving current according to the gate voltage of the first driving transistor T1-1 may be reduced.

Figure 14:
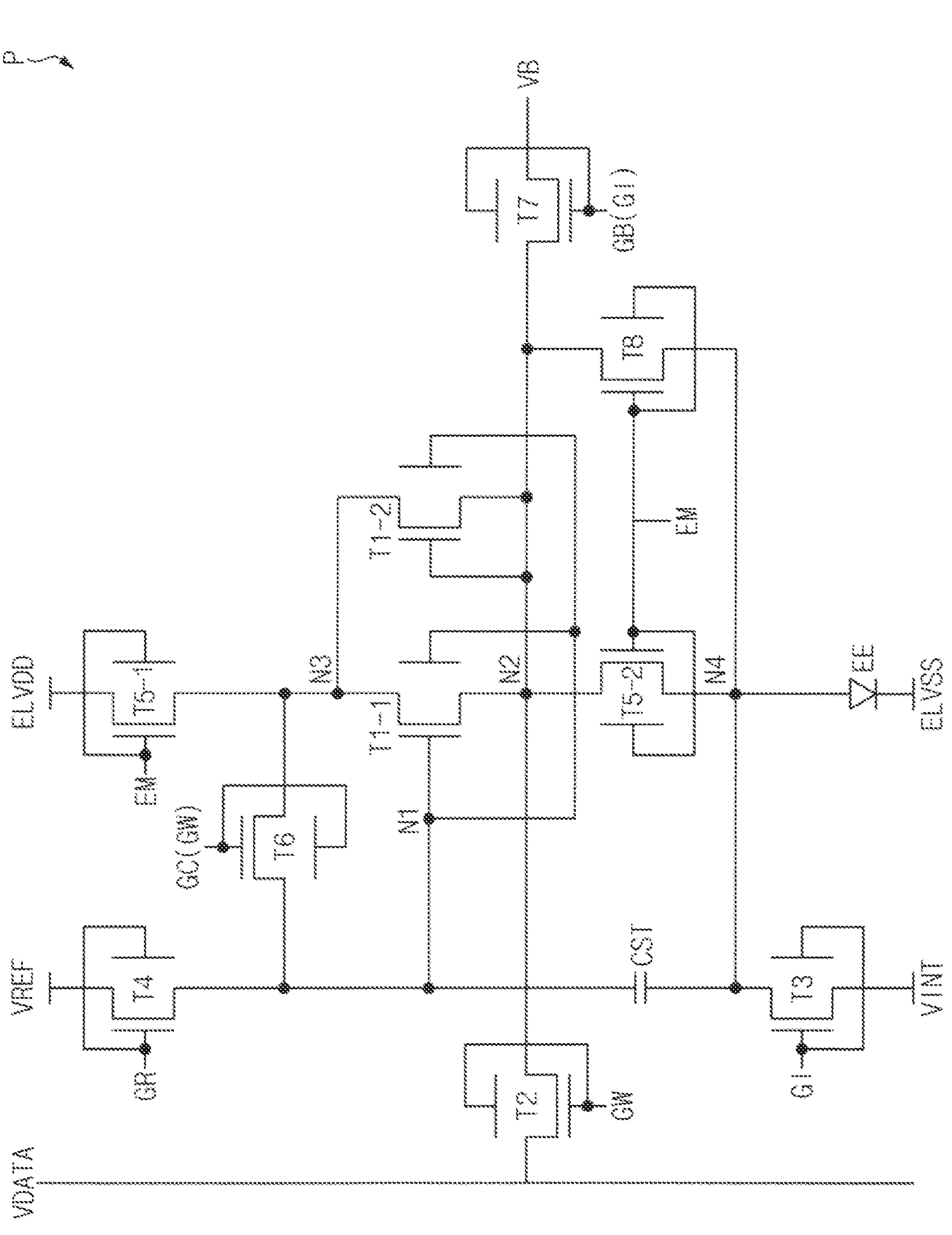

FIG. 14 is a circuit diagram illustrating an example of the pixel circuit P according to embodiments of the present disclosure.

The pixel circuit P according to one or more embodiments is substantially the same as the pixel circuit P of FIG. 12 with the exception of the back gate electrode of the first driving transistor T1-1. Thus, the same reference numerals are used to refer to the same or similar element, and any repetitive explanation will be omitted.

Referring to FIG. 14, the first driving transistor T1-1 may further include the back gate electrode connected to the first node N1. As a voltage is applied to the back gate electrode of the first driving transistor T1-1, a change in the first driving current according to the gate voltage of the first driving transistor T1-1 may be reduced.

Figure 15:
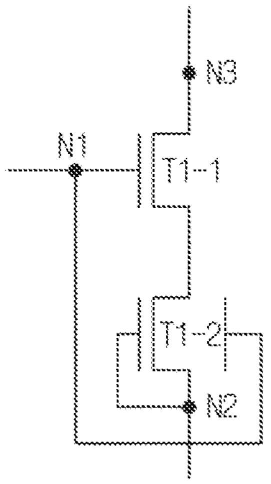
FIGS. 15 to 17 are circuit diagrams respectively illustrating an example of a first driving transistor and a second driving transistor of a pixel circuit according to embodiments of the present disclosure.

FIG. 15 is circuit diagram illustrating an example of the first driving transistor T1-1 and the second driving transistor T1-2 of the pixel circuit P according to embodiments of the present disclosure.

A structure of the first driving transistor T1-1 and the second driving transistor T1-2 of the pixel circuit P according to one or more embodiments may be applied to all of the above-described embodiments for a structure of the pixel circuit P. Thus, the same reference numerals are used to refer to the same or similar element, and any repetitive explanation will be omitted.

Referring to FIG. 15, the pixel circuit P may include the first driving transistor T1-1 including a gate electrode connected to the first node N1, a first electrode for receiving the first power voltage ELVDD (e.g., connected to the third node N3), and a second electrode connected to a first electrode of the second driving transistor T1-2, and may include the second driving transistor T1-2 including a gate electrode connected to the second node N2, the first electrode connected to the second electrode of the first driving transistor T1-1, a second electrode connected to the second node N2, and a back gate electrode connected to the first node N1. That is, unlike FIGS. 3A to 14, the first driving transistor T1-1 and the second driving transistor T1-2 may be connected in series.

Figure 16:
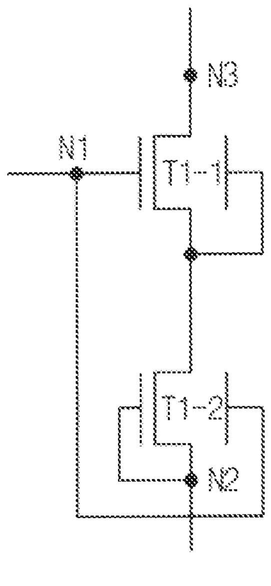

FIG. 16 is circuit diagram illustrating an example of the first driving transistor T1-1 and the second driving transistor T1-2 of the pixel circuit P according to embodiments of the present disclosure.

The pixel circuit P according to one or more embodiments is substantially the same as the pixel circuit P of FIG. 15 with the exception of the back gate electrode of the first driving transistor T1-1. Thus, the same reference numerals are used to refer to the same or similar element, and any repetitive explanation will be omitted.

Referring to FIG. 16, the first driving transistor T1-1 may further include the back gate electrode connected to a first electrode of the second driving transistor T1-2. As a voltage is applied to the back gate electrode of the first driving transistor T1-1, a change in the first driving current according to the gate voltage of the first driving transistor T1-1 may be reduced.

Figure 17:
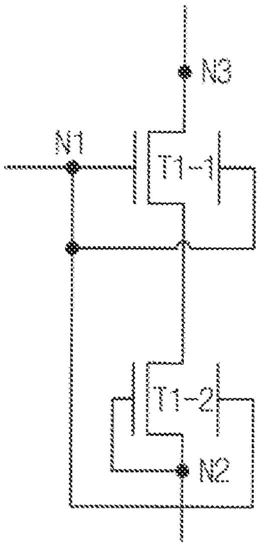

FIG. 17 is circuit diagram illustrating an example of the first driving transistor T1-1 and the second driving transistor T1-2 of the pixel circuit P according to embodiments of the present disclosure.

The pixel circuit P according to one or more embodiments is substantially the same as the pixel circuit P of FIG. 15 with the exception of the back gate electrode of the first driving transistor T1-1. Thus, the same reference numerals are used to refer to the same or similar element, and any repetitive explanation will be omitted.

Referring to FIG. 17, the first driving transistor T1-1 may further include the back gate electrode connected to the first node N1. As a voltage is applied to the back gate electrode of the first driving transistor T1-1, a change in the first driving current according to the gate voltage of the first driving transistor T1-1 may be reduced.

Figure 18:
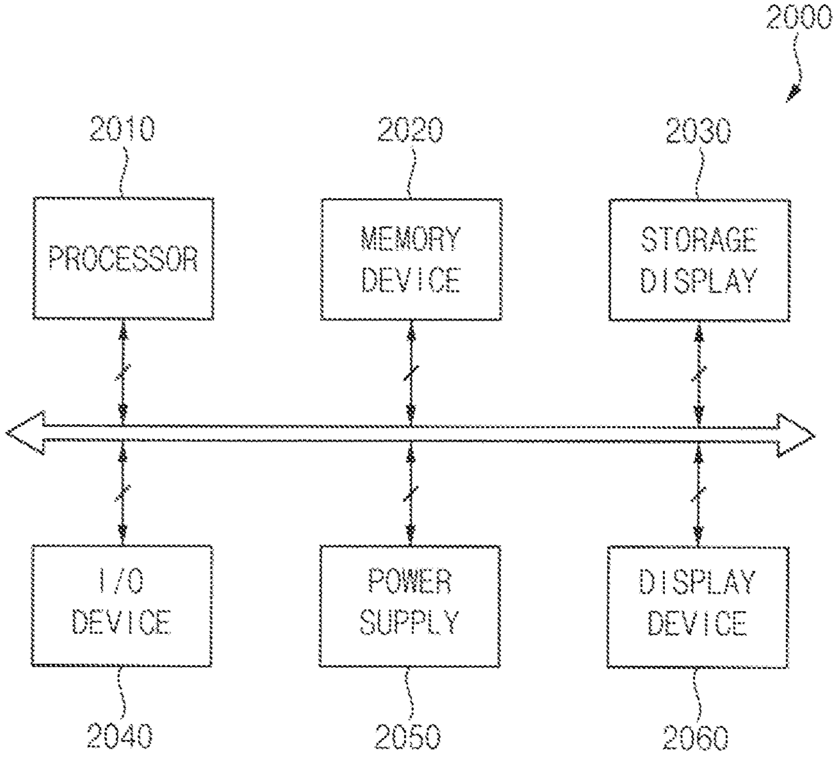
FIG. 18 is a block diagram showing an electronic device according to embodiments of the present disclosure.
Figure 19:
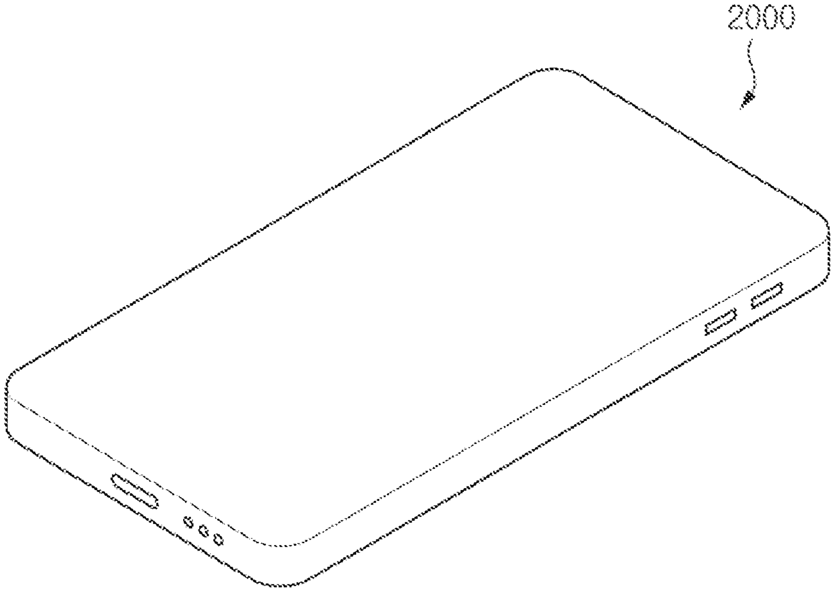
FIG. 19 is a diagram showing an example in which the electronic device of FIG. 11 is implemented as a smart phone.

FIG. 18 is a block diagram showing an electronic device according to embodiments of the present disclosure, and FIG. 19 is a diagram showing an example in which the electronic device of FIG. 11 is implemented as a smart phone.

Referring to FIGS. 11 and 12, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In one or more embodiments, as shown in FIG. 19, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a microprocessor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include a solid-state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may reduce a change in a driving current according to a gate voltage of a driving transistor by including a pixel circuit having an increased driving range of the driving transistor. Accordingly, the display device 2060 may reduce mura caused by a deviation in the threshold voltages of the driving transistors of the pixel circuits.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with functional equivalents of the claims to be included therein.

What is claimed is:

1. A pixel circuit comprising:

a first driving transistor comprising a gate electrode connected to a first node, a first electrode configured to receive a first power voltage, and a second electrode connected to a second node;

a second driving transistor comprising a gate electrode connected to the second node, a first electrode configured to receive the first power voltage, a second electrode connected to the second node, and a back gate electrode connected to the first node;

a write transistor comprising a gate electrode configured to receive a write gate signal, a first electrode configured to receive a data voltage, and a second electrode connected to the first node;

an initialization transistor comprising a gate electrode configured to receive an initialization gate signal, a first electrode configured to receive an initialization voltage, and a second electrode connected to the second node;

a storage capacitor comprising a first electrode connected to the first node, and a second electrode connected to the second node; and a light emitting element comprising a first electrode connected to the second node, and a second electrode configured to receive a second power voltage.

2. The pixel circuit of claim 1, wherein the first driving transistor further comprises a back gate electrode connected to the second node.

3. The pixel circuit of claim 1, wherein the first driving transistor further comprises a back gate electrode connected to the first node.

4. The pixel circuit of claim 1, further comprising an emission transistor configured to apply the first power voltage to the first driving transistor and to the second driving transistor in response to an emission signal.

5. The pixel circuit of claim 1, further comprising a reference transistor configured to apply a reference voltage to the first node in response to a reference gate signal.

6. The pixel circuit of claim 1, further comprising a hold capacitor comprising a first electrode configured to receive the first power voltage and a second electrode connected to the second node.

7. The pixel circuit of claim 1, wherein the write transistor further comprises a back gate electrode connected to the gate electrode of the write transistor, and wherein the initialization transistor further comprises a back gate electrode connected to the gate electrode of the initialization transistor.

8. The pixel circuit of claim 1, further comprising a reference transistor configured to apply a reference voltage to the first node in response to a reference gate signal.

9. A pixel circuit comprising:

a first driving transistor comprising a gate electrode connected to a first node, a first electrode configured to receive a first power voltage, and a second electrode connected to a second node;

a second driving transistor comprising a gate electrode connected to the second node, a first electrode connected to a third node, a second electrode connected to the second node, and a back gate electrode connected to the first node;

a write transistor comprising a gate electrode configured to receive a write gate signal, a first electrode configured to receive a data voltage, and a second electrode connected to the second node;

an initialization transistor comprising a gate electrode configured to receive an initialization gate signal, a first electrode configured to receive an initialization voltage, and a second electrode connected to a fourth node;

a storage capacitor comprising a first electrode connected to the first node, and a second electrode connected to the fourth node;

a compensation transistor comprising a gate electrode configured to receive a compensation gate signal, a first electrode connected to the third node, and a second electrode connected to the first node;

a first emission transistor comprising a gate electrode configured to receive an emission signal, a first electrode configured to receive the first power voltage, and a second electrode connected to the third node;

a second emission transistor comprising a gate electrode configured to receive the emission signal, a first electrode connected to the second node, and a second electrode connected to the fourth node; and a light emitting element comprising a first electrode connected to the fourth node, and a second electrode configured to receive a second power voltage.

10. The pixel circuit of claim 9, wherein the first driving transistor further comprises a back gate electrode connected to the second node.

11. The pixel circuit of claim 9, wherein the compensation gate signal is the same as the write gate signal.

12. The pixel circuit of claim 9, further comprising a first bias transistor comprising a gate electrode configured to receive a bias gate signal, a first electrode configured to receive a bias voltage, and a second electrode connected to the second node.

13. The pixel circuit of claim 12, wherein the bias gate signal is the same as the initialization gate signal.

14. The pixel circuit of claim 12, further comprising a second bias transistor comprising a gate electrode configured to receive the emission signal, a first electrode connected to the second node, and a second electrode connected to the fourth node.

15. A display device comprising:

a display panel comprising pixel circuits; and a display panel driver configured to drive the display panel, wherein each of the pixel circuits comprises:

a first driving transistor comprising a gate electrode connected to a first node, a first electrode configured to receive a first power voltage, and a second electrode connected to a second node;

a second driving transistor comprising a gate electrode connected to the second node, a first electrode configured to receive the first power voltage, a second electrode connected to the second node, and a back gate electrode connected to the first node;

a write transistor comprising a gate electrode configured to receive a write gate signal, a first electrode configured to receive a data voltage, and a second electrode connected to the first node;

an initialization transistor comprising a gate electrode configured to receive an initialization gate signal, a first electrode configured to receive an initialization voltage, and a second electrode connected to the second node;

a storage capacitor comprising a first electrode connected to the first node, and a second electrode connected to the second node; and a light emitting element comprising a first electrode connected to the second node, and a second electrode configured to receive a second power voltage.

16. The display device of claim 15, wherein the first driving transistor further comprises a back gate electrode connected to the second node.

17. The display device of claim 15, wherein the first driving transistor further comprises a back gate electrode connected to the first node.

18. The display device of claim 15, wherein each of the pixel circuits further comprises an emission transistor configured to apply the first power voltage to the first driving transistor and to the second driving transistor in response to an emission signal.

19. The display device of claim 15, wherein each of the pixel circuits further comprises a reference transistor configured to apply a reference voltage to the first node in response to a reference gate signal.

20. The display device of claim 15, wherein each of the pixel circuits further comprises a hold capacitor comprising a first electrode configured to receive the first power voltage, and a second electrode connected to the second node.

* * * * *